J. J. BERRIGAN.
METHOD OF EXPRESSING LIQUIDS.
APPLICATION FILED JULY 8, 1913.
1,130,879.
Patented Mar. 9, 1915.
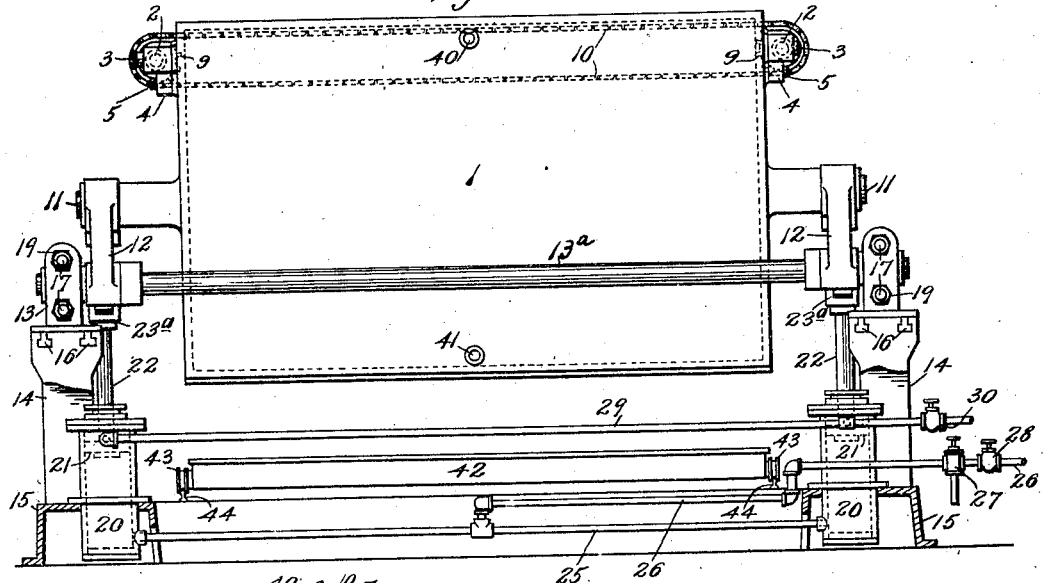
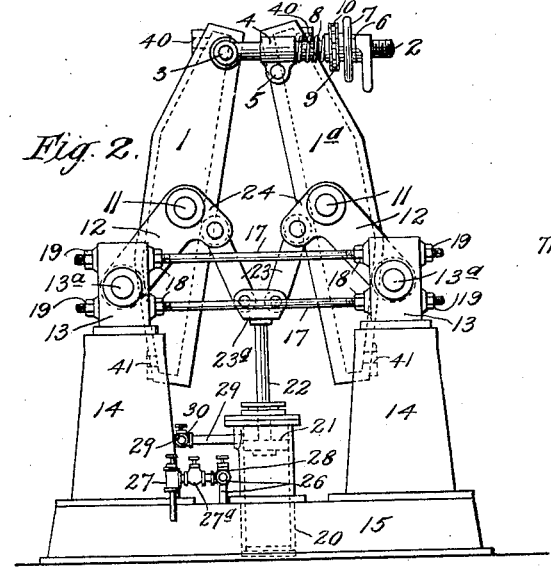
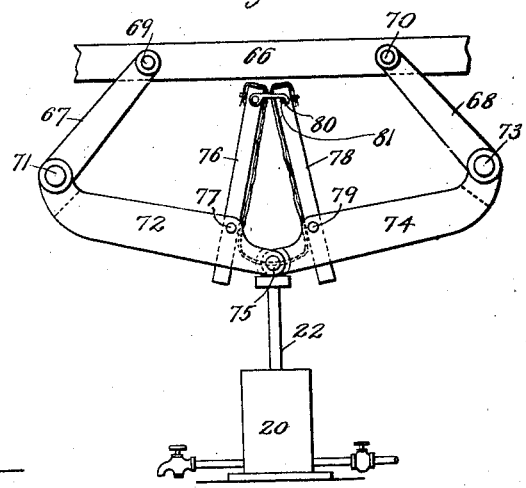

UNITED STATES PATENT OFFICE.

JOHN J. BERRIGAN, OF ORANGE, NEW JERSEY, ASSIGNOR TO HENRY R. WORTHINGTON, A CORPORATION OF NEW JERSEY.

METHOD OF EXPRESSING LIQUIDS.

1,130,879.  Specification of Letters Patent.  Patented Mar. 9, 1915.

Original application filed August 22, 1911, Serial No. 645,407. Divided and this application filed July 8, 1913. Serial No. 777,974.

*To all whom it may concern:*

Be it known that I, JOHN J. BERRIGAN, a citizen of the United States, residing at Orange, county of Essex, and State of New Jersey, have invented certain new and useful Improvements in Methods of Expressing Liquids, fully described and represented in the following specification and the accompanying drawings, forming a part of the same.

This invention relates to improvements in processes for expressing liquids from solids.

The separation of solids from liquids in certain classes of materials resulting from commercial manufacturing operations is often a matter of extreme difficulty. The waste liquors from the manufacture of starch, containing more or less gluten in excessively finely divided condition, are typical of the classes of materials just referred to, as are also the slops from "beer stills," cane juice, etc. Great difficulty has been encountered heretofore in the filtration of such liquids. Of course, such filtration can be done in a laboratory way on a small scale but so far as I am aware it has been difficult, if not impossible, to filter such liquids in an economical manner on a scale sufficiently large to permit of being carried out in commercial practice.

The object of the present invention is to provide a process whereby it will be possible to filter such liquids as above indicated in an efficient and at the same time economical manner.

I have described my invention hereinafter in connection with some novel forms of apparatus, particularly suitable for carrying out such invention, said apparatus being illustrated in the accompanying drawings, in which—

Figure 1 is a front elevation of one form of apparatus suitable for carrying out my invention. Fig. 2 a side view of the same. Fig. 3 is a side view of modified form of apparatus, suitable for this purpose.

In carrying out my new process for expressing liquids from solids, the liquid to be treated is placed within a relatively coarse filtering medium which in turn is inclosed within a fine filtering medium and the material is subjected to pressure, which, with difficultly filtrable materials, should be relatively lighter at first than toward the end of the pressing operation and most advantageously should gradually increase from the beginning to the end of the pressing operation and should be relatively long continued. In the best embodiment of the process, the material to be filtered, contained within a plurality of filtering media of different degrees of porosity or fineness, the finer medium being outside, is subjected to pressure heavier toward one end than toward the other, so that the liquid is not trapped within the filtering media but is given an opportunity to escape gradually, thus avoiding heavy strains on the filtering media.

When working with the difficultly filtrable liquids, of the type hereinbefore pointed out, by ordinary methods, it has been found that the almost impalpably fine solids tend to clog the ordinary filtering cloths and thereby prevent the passage of liquid through the same. If pressure is applied to hasten the flow of liquid, much of the fine solids pass through a filter cloth even of the finest kind with comparative ease, there being little or no separation of solids from the liquid. I have discovered that if, instead of trying to filter such mixture of liquid and finely divided solids directly through a very fine cloth, a somewhat coarse cloth be interposed between the material to be expressed and the fine cloth, there is then substantially no tendency for the finely divided solids to pass through such a plurality of filtering media. With this arrangement of filtering media, upon the application of pressure in a reasonable amount, the liquid can be expressed from the solids and will pass through the filtering media without clogging the same. Furthermore, the liquid under such suitable pressure passes the filtering media at a sufficiently rapid rate for commercial operation while at the same time being practically free from the solids. In carrying out this process it is important to apply a relatively light pressure at first and then to increase the pressure. Furthermore, in applying the pressure, it is best to increase it steadily and gradually. After a substantial deposit of solid material has been formed on the interiorly arranged relatively coarse cloth, the pressure may be raised considerably without danger to the cloth.

While I have found that the arrangement of the filtering media of different degrees of fineness with the coarser filtering medium inside produces advantageous results in the treatment of liquids such as hereinbefore stated, I have also discovered that most important advantages in practice are obtained by forming each filtering medium as a bag, the bag of coarser material being inside the bag of finer material and larger than the latter. All the tests made by me show that the inner bag should be considerably bigger than the outer bag. For example, I found particularly advantageous results were obtained when using an outer bag three feet by four feet with an inner bag of four feet by six feet, the larger dimensions of the two bags being vertical. As suitable material for the bags, different fabrics may be used without departing from the spirit of my invention. I have found that the outside bag may conveniently be made of duck ranging from 14 ounce hose duck to lamb skin filter cloth, with any of which materials may be used an inner bag of coarser material such as a relatively coarse unbleached cotton cloth.

Just why the particular method of filter pressing above described should give such clean separation of solids and liquids when filtering slimes and similar materials, I am not able to state positively. Whatever may be the theoretical explanation of the process, it is clear from repeated practical tests that it does produce eminently satisfactory and commercially economical results and I content myself with noting the observed facts without attempting to explain why they occur.

In carrying out the process, I have found that considerable advantage results if the pressure applied to the material within the filtering media of the kind described is of a yielding nature. I have also found that a pressure of this kind is most satisfactorily obtained by the employment of a press actuated by the force of gravity since such a press will, owing to the yielding nature of the force, accommodate itself to any variations in resistance due to variations in the manner in which the solids deposit to form the filter cake.

While my process may be carried out with various apparatus, I have devised a new type of press particularly suited for that purpose, which will now be described.

Referring to Figs. 1 and 2 of the drawings, 1, 1ª, indicate coöperating pressing members, in this case comprising a pair of platens arranged to be pivotally connected together toward one end. In the apparatus shown, the pressing members are pivotally connected at their top ends by a suitable means comprising a device located at each side of the pressing members. Each connecting device, in the example illustrated, consists of a screw 2, pivotally connected to one of the pressing members, as by a pivot pin 3 secured to one of the pressing members and passing through an eye in said screw 2, and the screw passing through a sleeve 4, swiveled to the other pressing member, as for example by pivotally mounting said sleeve 4 on a pivot pin 5. Upon the screw is mounted a nut 6 provided with an arm 7 by which it may be rotated manually. Between the nut 6 and the sleeve 4 a suitable yielding means for holding the two pressing members together is provided, this yielding means, in connection with the screw and nut, also constituting a pressure limiting connection between the pressing members. In the apparatus illustrated, the yielding means consists of a helical spring 8, surrounding the screw and bearing at one end against the sleeve 4 and at the other end against the nut 6.

It will be clear from the description thus far that by rotating the nuts 6 of the two devices, the distance apart of the two pressing members at the point of pivotal connection may be varied, and owing to the presence of the spring 8 this connection is a yielding one.

Since in actual practice it is important that the two nuts 6 should be adjusted simultaneously in order to avoid unnecessary strains on the pressing members, suitable transmitting mechanism is employed between the two nuts 6, whereby the manual adjustment of one nut will result in the corresponding adjustment of the other nut. In the example illustrated, this result is accomplished by providing for each nut a sprocket wheel as indicated at 9, these sprocket wheels being connected by a suitable sprocket chain indicated at 10, Fig. 1.

The coöperating pressing members 1, 1ª, are so mounted as to be capable of movement in a general up and down direction, so that by lifting the said pressing members to a certain position upward and then releasing them they may descend under the action of gravity, and means are provided for causing this downward movement or descent of the pressing members to produce a movement of said pressing members toward each other. In carrying out my process for expressing liquids from solids, it is particularly advantageous to subject the material to be expressed first to a light pressure and later to a heavier pressure, and in the preferred apparatus, the construction is such as to accomplish this result, that is to say, means is provided whereby the downward movement of the pressing members causes them to be moved toward each other at a gradually decreasing rate of speed compared with the downward velocity of said pressing members, so that when material to be pressed is in place between the said pressing members, the said material and the members themselves will be subjected to a gradually increasing pressure in directions tending to move the pressing members toward each other. In the construction illustrated in the drawings, these results are attained in a simple manner by pivotally mounting each pressing member in levers, or link devices, arranged one at each side of each pressing member, said levers being provided with fixed or stationary fulcrums, which however may be adjustable, as hereinafter explained, these fulcrums being in a plane lying below the plane through the points where the pressing members are pivoted to the said levers. In the example illustrated the pressing members 1, 1ª, are provided at each side with horizontally projecting trunnions 11, and each trunnion is journaled, or pivotally mounted, in one end of a link or lever, as indicated at 12, each lever being fulcrumed in a suitable boxing or fulcrum, as indicated at 13, these fulcrums being arranged to be adjustable yet fixed or stationary in any position to which they may be adjusted. In the example illustrated the links supporting each pressing member are fixed to a shaft 13ª, each shaft being mounted rotatably in its respective boxings 13, which are mounted on suitable supports such as the pedestals 14, secured to a base 15. It will be observed that in the construction illustrated there is a pair of boxings 13 at each side of the pressing members, and each boxing 13 is so mounted on its respective pedestal as to be adjustable toward or from the other boxing of the pair. To permit of this adjustment while at the same time suitably holding the boxing to its respective pedestal, an interlocking device is provided between each pedestal and its respective boxing, this being formed as follows in the present example. Each boxing 13 is provided with a plurality of downward extending T-heads or dovetailed ribs 16 which slide in correspondingly dovetailed grooves or guideways, so that each boxing of a pair can move toward or from the corresponding opposite boxing of the same pair, but is incapable of movement in any other direction. Suitable adjusting mechanism is provided for adjusting the boxings 13 of a pair toward or from each other and for locking or holding such boxing rigidly in any position to which they may be adjusted. In the present instance this means consists of a pair of tension rods 17 for each pair of boxings 13, these rods passing through holes in the boxings 13 above and below the fulcrums of the respective levers, said rods being screw-threaded and provided with inside and outside nuts 18, 19, which serve to clamp the respective boxings between them. It will be noticed that the weight of the pressing members 1, 1ª, will tend to swing the links or levers 12 downward and as these are fulcrumed in the stationary boxings 13 and hence have an angular movement with relation to their fulcrums, the pressing members are caused to move toward each other as they descend, so that any material will be pressed by them, the reaction due to such pressure being sustained by the levers 12, and their fulcrums, the levers being subjected to a compressive strain as a result of this reaction, wherefore said levers must be constructed as thrust members so as not to be deflected by the compressive strains.

Since the weight of the pressing members causes a thrust on each lever and its fulcrums in a direction such as to move each boxing of a pair away from the corresponding boxing of the pair, it is only necessary to screw outward the nuts 18, 19, of the tension rods 17 in order to properly adjust the fulcrums outward, the boxings moving outward under the outward thrust when permitted to do so by the proper movement of the said nuts, and being drawn toward each other when the nuts are screwed in the reverse direction for that purpose.

The proportioning and adjustment of the parts are intended to be such, under the best conditions of operation, that when material is in place between the pressing members the latter will have such a limit of downward movement that the levers 12 will come to a substantially horizontal position, that is to say, the pivotal points of each end of each lever will be in a substantially horizontal plane or, at least, the said levers will make an infinitesimal angle to such horizontal plane, with the inner pivotal points slightly above the horizontal plane. Furthermore, at this limit, the pressing faces of the pressing members should lie in substantially vertical planes. By this construction the pressure to which the material is subjected gradually increases and theoretically should approach infinity at the conclusion of the pressing operation. The initial pressure at the beginning of the pressing operation is determined by the weight of the pressing members and their load of material, assisted by the weight of the attached parts.

For the purpose of giving control of the pressure to which the material is to be subjected, the apparatus is provided with means arranged to check the fall or descent of the pressing members, said means acting in a direction opposed to that of gravity. Such a means may be in the form of a brake, such as a hydraulic brake or delay-action device, and is most advantageously arranged to be controllable or adjustable in its action. In the present example, this checking or controlling means comprises a piston and cylinder, one of these two parts being so connected with the pressing apparatus that the descent of the pressing members will produce a relative motion between the two parts, this motion being checked by a fluid contained in the cylinder, the arrangement being such that said fluid will be forced out of the cylinder by the said relative movement of the parts, the rate of discharge of the fluid being controllable. In the example shown the cylinder, indicated at 20, is provided with a piston 21, movable therein. The piston is connected with some part of the press which will move during the descent of the pressing members so that such movement will cause the movement of the piston. In the present example the piston 21 is provided with a piston rod 22 having a head 23ª at its upper end, to which are pivotally connected two links 23, whose other ends are pivotally connected to arms 24 carried by the levers 12. In this example the descent of the pressing members causes a downward movement of the piston 21 in the cylinder. An outlet for the fluid is provided below the piston, this outlet being controlled by an adjustable valve, as will be more fully explained hereinafter. Hence by adjusting the valve, the rate of escape of the fluid from beneath the piston may be regulated.

In order to balance the strains on the pressing apparatus it is advantageous to provide each side of the latter with a cylinder and piston, as shown in Fig. 1. With such duplicate apparatus the outlets of the cylinders are connected by a pipe 25 which at an intermediate part is connected to a pipe 26 in which is located a controlling valve 27, which, for the present purposes should be a finely adjustable needle valve, in order that said valve may be adjusted to allow the escape of the fluid very slowly, even drop by drop, when necessary. The valve may be cut off from the system by a valve 27ª, and thus the descent of the pressing members stopped when desired.

In the practical operation of the press it is necessary to provide means for lifting the pressing members, and for this purpose, as well as to replace the fluid beneath the piston, the pipe 26 is connected to any suitable source of fluid supply, not shown, a supply valve 28 serving to control the admission of such supply. By closing the needle valve 27 and opening the valve 28 the pistons 21 will be forced upward and thereby the pressing members will be raised and also, owing to the method of their mounting, will be separated so that the material already pressed may be removed and new material to be pressed may be inserted between the pressing members.

In order to apply and extraneous force supplemental to gravity for the purpose of increasing the pressure on the material to be pressed, suitable means may be provided for applying power to any of the moving parts in such a direction as to move or assist in moving the coöperative pressing members toward each other. In the present example such means is combined with the checking or delay-action device, by providing devices for applying a pressure to the upper side of one or both of the pistons 21. In the present example each cylinder 20 is provided at its upper end with an inlet connected to a feed pipe 29, common to both cylinders, said feed pipe being connected to a suitable source of fluid supply (not shown) which may be steam, compressed air or water under pressure. Suitable valves for controlling the admission to the cylinders may be provided as indicated at 30. This means for applying a supplemental force to the pressing members is particularly advantageous for use at the last stages of the pressing operation since it assists in giving a final heavy squeeze to the material.

It is to be observed that by the use of an incompressible fluid, such as water, beneath the pistons, the latter may be reliably and positively controlled during the descent of said pistons and may be positively raised to lift the pressing members, while on the other hand by the use of an elastic fluid such as compressed air or steam upon the upper side of the pistons, the supplemental pressure applied to the pressing members is a yielding one, whereby unnecessary strains on the pressing members are avoided. From this it will be clear that the apparatus may be provided with positive means for controlling the descent of the pressing members and with yielding means for increasing the pressure of said pressing members on the material.

In order that the material being pressed may be treated at any desired temperature, the pressing members are suitably provided with means for heating or cooling them. This is conveniently done by making said pressing members hollow and providing each with an inlet for a heating or cooling fluid as indicated at 40 and with an outlet for such fluid as indicated at 41.

For the purpose of receiving the liquid discharged from the press, any suitable receptacle may be mounted beneath the pressing members, and in the drawings I have shown a tray 42, mounted on rollers 43 arranged to move on rails 44 for the purpose of receiving the discharge from the press.

The filtering media may be held in place in various ways, sometimes being formed merely as a pair of bags, one within the other, these bags being suitably secured together if desired at the top and placed between the pressing members, after which the top edges of the pressing members are brought together whereby the top of the bag will be clamped to hold the same. Or, if desired, the filter cloths may be brought over the top edges of the pressing members and held by suitable eyelets engaging pins on the exterior faces of said pressing members. This construction is illustrated in Figs. 3.

Instead of supporting the pressing members from below as in the construction shown in Figs. 1 and 2, the said pressing members may be supported from above. Such a construction is illustrated in a typical form in Fig. 3. Referring to these views, 66 is a framework supporting the press units of which there may be one, as shown, or a plurality. Suspending arms or links 67 and 68 are pivoted at 69 and 70 to the framework. The arms 67 are pivotally joined at 71 to members 72 while arms 68 are similarly connected at 73 to members 74, the members or lever arms 72 and 74 being pivotally joined as at 75. Press member 76 is pivotally mounted at 77 on members 72, the coöperating press element 78 being similarly mounted at 79 on members 74. These press elements are intended to be of considerable weight and therefore are most conveniently iron castings. In this construction hooks 80 on one of the press elements are arranged to engage pins 81 on the other element, thereby serving as latches to hold the upper ends of the press elements together whereby there is formed a V-shaped pressing member.

The means for lifting the pressing members and for checking their descent may be the same as has been described hereinbefore in connection with the first form of press. It will be noted that in this construction the hooks and pins serve as means for pivotally connecting the upper edges of the pressing members. The operation of this form of press will be readily understood from the description of the operation hereinbefore given of the press shown in Fig. 1.

The present application constitutes a division of my application Serial No. 645,407; filed August 22, 1911.

What I claim is:—

1. The process of expressing liquids from solids, which comprises inclosing the material to be pressed within filtering media comprising filtering fabrics of different degrees of fineness arranged one inside another, the finer filtering fabric being outside, and then subjecting the material to pressure.

2. The process of expressing liquids from solids, which comprises inclosing the material to be pressed within filtering media comprising filtering fabrics of different degrees of fineness arranged one inside another, the finer filtering fabric being outside, and then subjecting the material first to a relatively light pressure and later to a heavier pressure.

3. The process of expressing liquids from solids, which comprises inclosing the material to be pressed within filtering media comprising filtering fabrics of different degrees of fineness arranged one inside another, the finer filtering fabric being outside, and then subjecting the material to a gradually increasing pressure.

4. The process of expressing liquids from solids, which comprises inclosing the material to be pressed within filtering media comprising filtering fabrics of different degrees of fineness arranged one inside another, the finer filtering fabric being outside, and then subjecting the material to a pressure heavier at one end of said material than toward the other end.

5. The process of expressing liquids from solids, which comprises inclosing the material to be pressed within filtering media comprising filtering fabrics of different degrees of fineness arranged one inside another, the finer filtering fabric being outside, and then subjecting the material to a pressure heavier at one end of said material than toward the other end, and then gradually increasing the amounts of such different pressures.

6. The process of expressing liquids from solids, which comprises inclosing the material to be pressed within filtering media comprising filtering fabrics of different degrees of fineness arranged one inside another, the finer filtering fabric being outside, and then subjecting the material to a slowly increasing pressure and then to a sudden heavier pressure.

7. The process of expressing liquids from solids, which comprises inclosing the material to be pressed within filtering media comprising bag-form filtering fabrics of different sizes and different degrees of fineness arranged one inside another, the smaller bag being of finer filtering fabric and located outside, and then subjecting the material to pressure.

8. The process of expressing liquids from solids, which comprises inclosing the material to be pressed within filtering media comprising bag-form filtering fabrics of different sizes and different degrees of fineness arranged one inside another, the smaller bag being of finer filtering fabric and located outside, and then subjecting the material to gradually increasing pressure.

9. The process of expressing liquids from solids, which comprises inclosing the material to be pressed within filtering media comprising bag-form filtering fabrics of different sizes and different degrees of fineness arranged one inside another, the smaller bag being of finer filtering fabric and located outside, and then subjecting the material to a pressure heavier at one end of the bag than at the other end.

10. The process of expressing liquids from solids, which comprises inclosing the material to be pressed within filtering media comprising filtering fabrics of different degrees of fineness, said filtering fabrics being located one inside the other, the finer filtering fabric being outside, and then subjecting the material to pressure commencing first at one end and then progressively extending toward the other end.

11. The process of expressing liquids from solids, which comprises inclosing the material to be pressed within filtering media comprising filtering fabrics of different degrees of fineness, said filtering fabrics being located one inside the other, the finer filtering fabric being outside, and then subjecting the material to pressure commencing first at the upper end and then progressively extending to the lower end.

In testimony whereof, I have hereunto set my hand, in the presence of two subscribing witnesses.

JOHN J. BERRIGAN.

Witnesses:
J. A. GRAVES,
T. F. KEHOE.

Copies of this patent may be obtained for five cents each, by addressing the "Commissioner of Patents, Washington, D. C."